United States Patent [19]

Blank et al.

[11] Patent Number: 4,853,019
[45] Date of Patent: Aug. 1, 1989

[54] METHOD FOR THE TRANSPORTATION OF GLASS SHEETS BROUGHT TO THE DEFORMATION TEMPERATURE, ITS APPLICATION TO BENDING AND DEVICE FOR ITS IMPLEMENTATION

[75] Inventors: Kurt Blank, Aachen; Friedrich Halberschmidt, Herzogenrath; Heinz-Josef Reinmold; Josef Audi, both of Aachen; Jakob Kaesmacher, Stolberg; Ralf Reinicke; Udo Niedenhoff, both of Cologne, all of Fed. Rep. of Germany

[73] Assignee: Saint Gobain Vitrage, Neuilly sur Seine, France

[21] Appl. No.: 537,674

[22] Filed: Sep. 30, 1983

[30] Foreign Application Priority Data

Oct. 11, 1982 [FR] France ................................ 82 16969

[51] Int. Cl.[4] ............................................ C03B 23/035
[52] U.S. Cl. ........................................ 65/106; 65/25.4; 65/111; 65/114; 65/273; 65/351
[58] Field of Search ...................... 65/25.2, 25.4, 107, 65/273, 106, 111, 114, 350, 351

[56] References Cited

U.S. PATENT DOCUMENTS

| 3,084,526 | 4/1963 | Richardson | 65/268 |
|---|---|---|---|
| 3,123,344 | 6/1964 | Ross | 263/6 |
| 3,223,498 | 12/1965 | Davidson | 65/25 |
| 3,372,016 | 3/1968 | Rahrig et al. | 65/114 |
| 3,387,962 | 6/1968 | Whitmire | 65/104 |
| 3,396,000 | 8/1968 | Carson et al. | 65/107 |
| 3,545,951 | 12/1970 | Nedelec | 65/104 |
| 3,665,730 | 5/1972 | Linzer | 65/182 A |
| 3,801,298 | 4/1974 | Bezombes | 65/351 X |
| 3,809,542 | 5/1974 | Lythgoe et al. | 65/33 |

FOREIGN PATENT DOCUMENTS

| 859647 | 12/1970 | Canada . |
|---|---|---|
| 1071404 | 2/1980 | Canada . |
| 2741098 | 3/1979 | Fed. Rep. of Germany . |
| 1176617 | 11/1958 | France . |
| 1454707 | 8/1966 | France . |
| 1476785 | 3/1967 | France . |
| 2312463 | 12/1976 | France . |
| 2342947 | 9/1977 | France . |
| 1509989 | 5/1978 | United Kingdom . |

*Primary Examiner*—Arthur Kellogg
*Attorney, Agent, or Firm*—Pennie & Edmonds

[57] ABSTRACT

Apparatus and method for moving a glass mass, such as a glass sheet in horizontal attitude through a bending section of a heating oven. The glass sheet at a deformation temperature is imparted movement along the conveyor system including a plurality of rollers, and a gaseous flow at high temperature, having a flow speed which varies continuously across the width of the glass sheet, impinges on its lower surface to at least partially balance the weight of the glass sheet in regions requiring good optical quality.

14 Claims, 3 Drawing Sheets

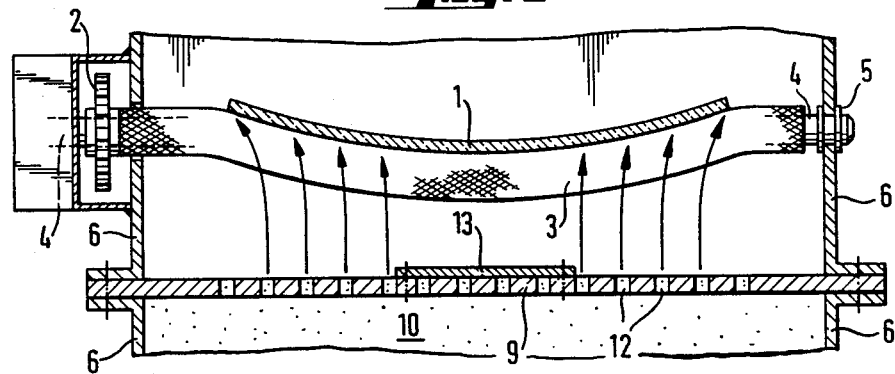
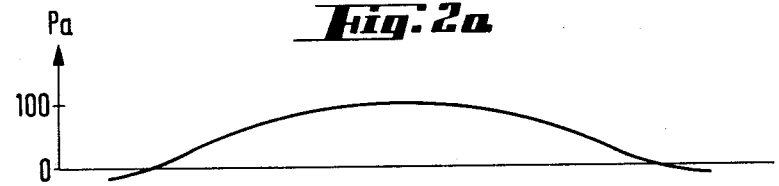
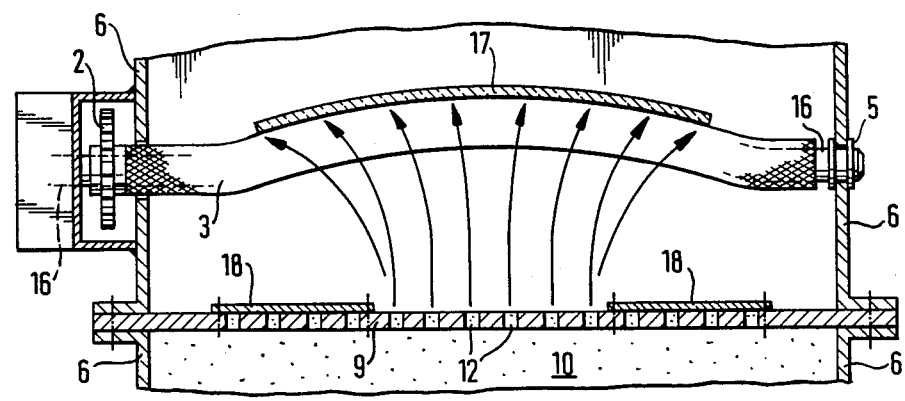

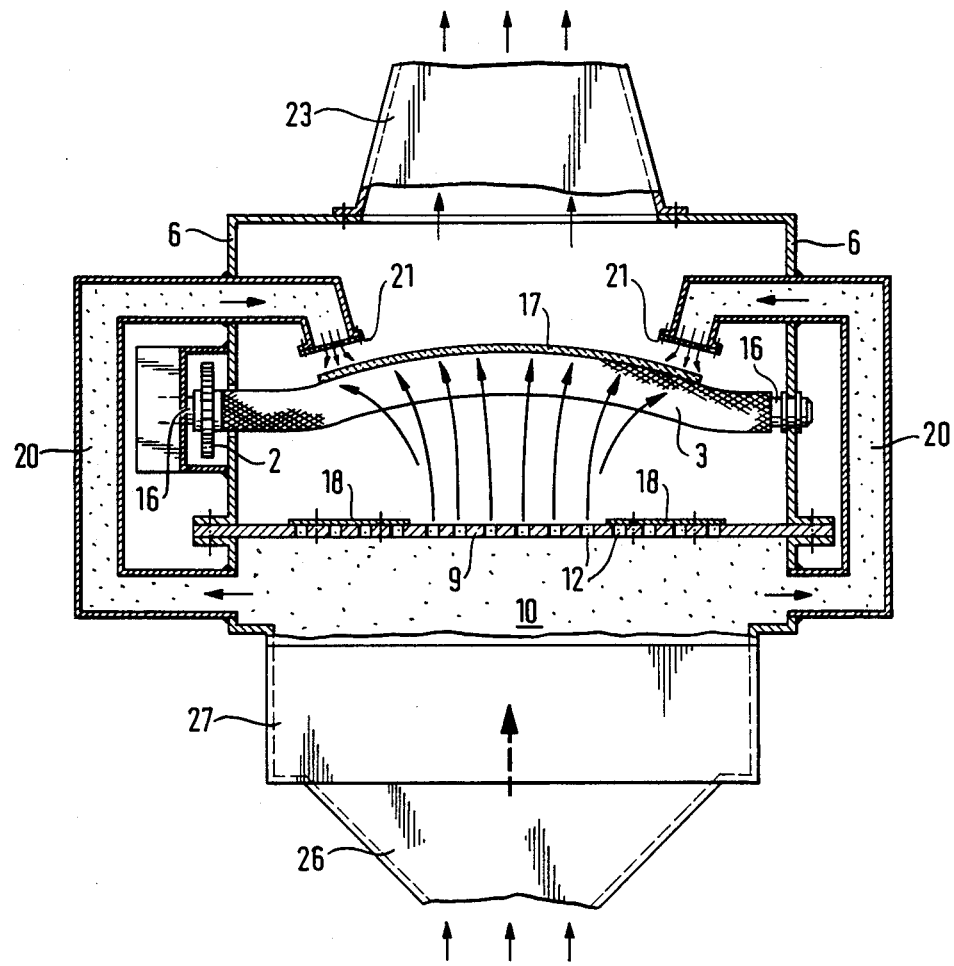

METHOD FOR THE TRANSPORTATION OF GLASS SHEETS BROUGHT TO THE DEFORMATION TEMPERATURE, ITS APPLICATION TO BENDING AND DEVICE FOR ITS IMPLEMENTATION

TECHNICAL FIELD

The invention relates to apparatus for moving a glass mass, such as a sheet of glass in a horizontal attitude along a roller conveyor through a heating region within which the glass sheet is brought to an elevated, deformation temperature, and for directing a flow of gas at high temperature on a surface of the glass sheet to reduce reaction of the rollers. The glass sheet has a particular use as a safety glass for vehicles.

BACKGROUND ART

Apparatus for purposes of bending and/or tempering a glass mass to toughen the glass for use as a safety glass for vehicles are known in the prior art. It is also known from the prior art that the glass mass may be brought to its deformation temperature to achieve this result thermally during movement of the glass mass through a lehr or heating oven.

One representative disclosure of the prior art is U.S. Letters Pat. No. 3,084,526 to R. E. Richardson. The Richardson patent relates to apparatus for bending a sheet of glass for use in the manufacture of automobile windshields and rear windows. The apparatus is disclosed as a multipart skeleton mold which supports the sheet of glass which may be provided with a compound bend during transit with the mold as the mold moves through the heating oven.

According to Richardson, if a complex bent shape is to be achieved, those areas of the glass sheet which will be formed to a compound shape, for example, provided with a sharply curved contour, will be subjected to heat of greater intensity than the intensity of heat at other areas of the glass sheet carried on the mold. A localized heating of the glass sheet may be the result of a number of heating devices carried by the mold, itself.

Richardson, however, recognizes that the glass sheet which is subject to localized heating may be heated too rapidly, and, as a consequence, the glass sheet may sink in various places within its surface area. To overcome this problem, Richardson describes the use of one or more nozzles along the heating oven to blow cold air on the glass sheet at times which are determined for the purpose of cooling the glass sheet within areas as determined by the localized heating. The cooling air, thus, will prevent sinking of the glass.

The prior art also discloses that a glass mass, such as a sheet of glass may be moved through a heating oven while supported on a conveyor system comprised of cylindrical rollers or bent transportation rollers, if it is desired to manufacture a glass sheet bent to some shape. Transportation rollers which are bent in a desired shape have been described in French Pat. Nos 1,476,785 and 2,372,463. Briefly, these transportation rollers are surrounded by flexible tubular sheaths, which are rigid in rotation and rotate on the bent support.

The glass masses which move along these conveyor systems oftentimes deform within the hot section of the heating oven The deformation characterized by a small, unwanted bending normally results from a non-uniform support of the glass mass throughout its entire surface area.

The use of one or more nozzles, according to the Richardson teaching, along the heating oven to blow cold air on the glass mass to prevent sinking or deformation within localized areas has not been considered possible or, if possible, practicable under circumstances that the glass mass is moved by a conveyor system including either cylindrical or bent rollers. The Richardson operation is carried out on a glass mass which is stationary on the conveyor system.

According to the prior art, small, unwanted deformation in the glass mass may be remedied by directing a flow of gas at high temperature toward the glass mass from a location below the glass mass. The flow of gas will impinge upon the glass mass within regions between the rollers of the conveyor system. Typical of prior art of this type are Canadian Pat. No. 859,647 and German Offenlegungsschrift 2,741,098. Both of these references discuss that the purpose of the flow of gas, at some pressure, is to balance a part of the weight of the glass mass supported by the conveyor system. According to the references, the pressure which is exerted by the flow of gas is exerted at a constant value throughout the conveyor system, laterally of the width of the glass mass and its direction of movement. Thus, the flow of gas is indicated to support the glass mass uniformly across its width, and the additional or non-supported weight of the glass mass acting on the rollers is sufficient to generate a rubbing force necessary for transport of the glass mass by the conveyor system through the heating oven.

SUMMARY OF THE INVENTION

The invention seeks to overcome the problems and disadvantages recognized in the prior art, as briefly discussed above. In particular, the invention comprises apparatus for conveying a glass mass through a heating oven and apparatus for directing a flow of gas at high temperature toward the undersurface of the glass mass (hereafter "sheet") In particular, the invention is directed towards apparatus for directing a flow of gas at high temperature to provide a profile of speed of flow and dynamic pressure which varies continuously across the width of the sheet. The distance of emission may be between 5 cm and 20 cm.

According to the invention, the variation in the speed of flow of the gas in spaces between the transportation rollers will generate a dynamic pressure on the undersurface of the sheet which varies continuously. The dynamic pressure will correspond to the flow of gas to compensate for the weight of the sheet to a greater extent along some other areas which spread in the direction of transportation than inside other parallel areas. Thus, it is possible to support the sheet with a flow of gas in areas having a requirement for a field of good optical quality more strongly than in other areas of the sheet wherein the optical quality requirements need not be especially good. Those areas of the sheet which are less strongly supported will be subjected to greater reaction forces from the transportation rollers of the conveyor system. In a preferred embodiment of the invention, the entire central portion of the sheet may be relieved of rubbing forces to a greater degree of relief than the lateral areas of the sheet. These lateral areas ultimately are covered or partially covered by a frame when the sheet, in its use as a windshield, is received in the vehicle so that the optical quality need not be as good.

According to a development of the invention, when the apparatus is used in the bending section of a heating oven, a jet or jets of the gas flow providing a lower average output per surface area of sheet are directed toward the areas of the sheet which are sinking under the effect of their own weight. Thus, through a set profile of dynamic pressure, it is possible to assist, as well as to accelerate, the bending process without the bending forces exerted by the flow causing detrimental concentrations of efforts on the sheets. The range of dynamic pressure to be applied is determined by factors, such as the thickness and shape of the glass sheet, among possible other factors. According to the invention, the range of dynamic pressure may be between 20 and 300 Pa.

Other advantages and a more specific characterization of the invention will be described as the description to be read in conjunction with reference to the accompanying figures of drawing continues.

DESCRIPTION OF THE DRAWING

FIG. 1 is a vertical section of a bending section of a heating oven of the invention providing a conveyor system including transporting rollers formed to a concave bed;

FIG. 1a represents the profile of dynamic pressures within the bending section of the heating oven of FIG. 1;

FIG. 2 is a vertical section of the bending section of a heating like the heating oven of FIG. 1, with the transporting rollers formed to a convex bed;

FIG. 2a represents a profile of dynamic pressures within the bending section of the heating oven of FIG. 2;

FIG. 3 is a vertical section of a bending section of a heating oven and conveyor system like that of FIG. 2 including structure and capability of providing an auxiliary flow of gas along the marginal edges of the sheet.

BEST MODE FOR CARRYING OUT THE INVENTION

Figure 4:
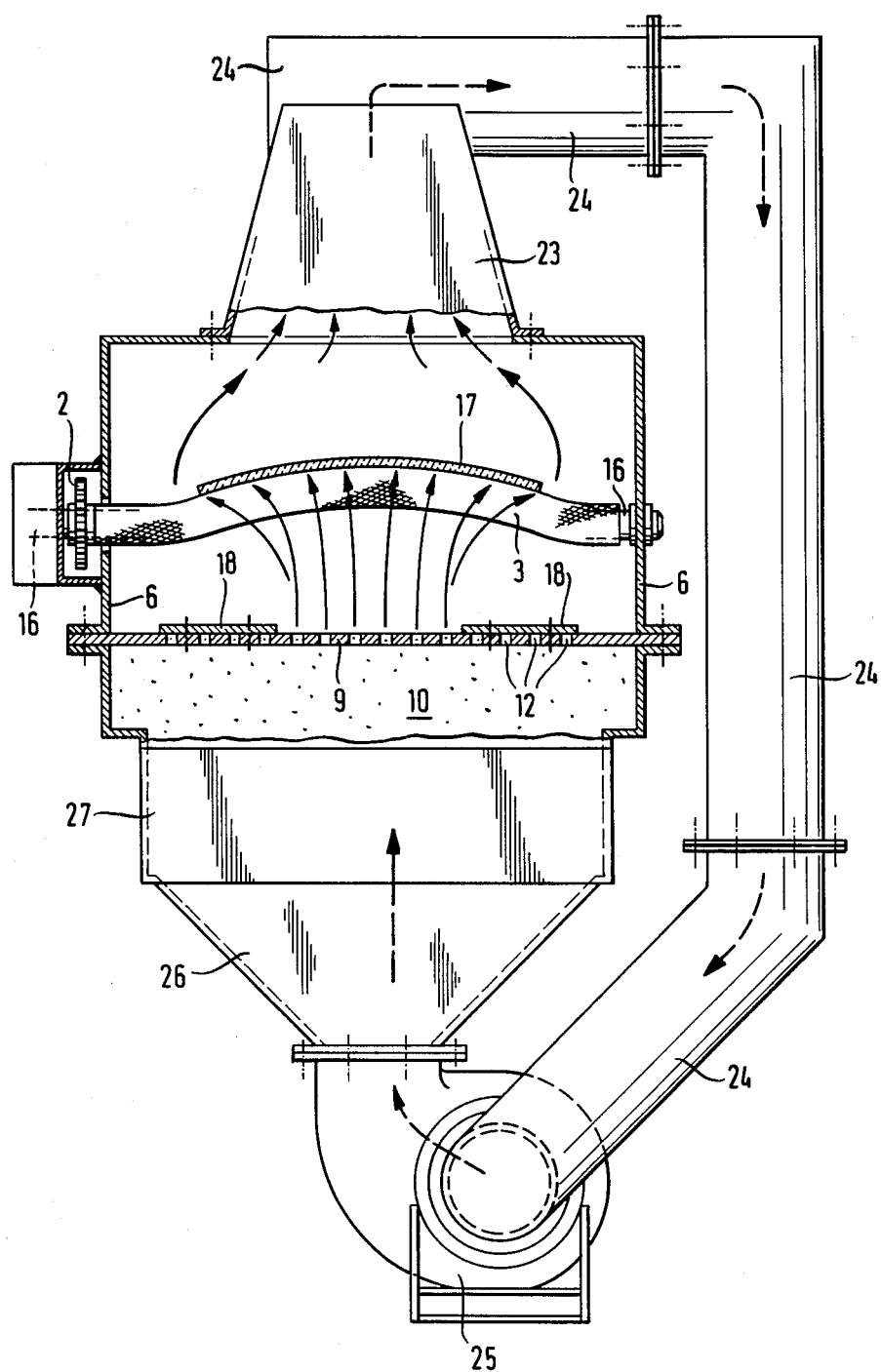
FIG. 4 is a vertical section of a bending section of the heating oven of FIG. 2 included within a system for recirculating the gas flow.

The apparatus of the invention, and modifications of the apparatus, may be seen in FIGS. 1–4. The apparatus and the method for treating and toughening a sheet may be used and carried out within a bending section of a horizontal heating oven as the sheet is moved along a conveyor system. The conveyor system may be comprised of a plurality of rollers formed to the curvature of the sheet which is to be formed, or it may be comprised of a plurality of cylindrical rollers forming a flat bed.

The apparatus included within the bending section of a horizontal heating oven will be described with reference to the Figures, each of which is a schematic illustration of the conveyor system of the first-mentioned type and illustrating further, a single roller of the system providing one of a concave or convex pattern along the bending section.

With reference to FIG. 1, the bending section of the heating oven is represented by a pair of walls 6 spaced apart to provide a path of movement of a sheet 1 in a conveyed direction from, for example, a pre-heating section to an annealing section at a downstream location. Features of the bending section of the heating oven may be considered conventional. The conveyor system includes a plurality of rollers, each formed by a sheath 3 supported by an axle 4. The axle extends between the walls and is supported at its ends in a bearing 5. Only a single bearing, carried by the right wall (in FIG. 1), is shown although it should be considered that a similar bearing will support the left end of axle 4. As discussed, the axle of FIG. 1 and all other axles which comprise the rollers of the conveyor system are formed concave throughout substantially their length between walls 6. Each axle is immovably supported within its supporting bearings, and the sheath 3 is supported for rotation about the axle. Thus, it is the several sheaths, when placed in rotation, which convey the sheet through the bending section. Each sheath is connected at one end to a pinion 2 and it is the pinion, driven by a prime mover (not shown), which imparts rotational movement to the sheath.

The sheath 3 is formed by a material which is flexible yet rigid in torsion, and of a material that will not harm or otherwise degrade substantially the surface of the sheet. The material, further, will be one having a capability of sliding, rotational movement about an axle.

The bending section includes a chamber 10 below the conveyor system. A plate 9, which preferably is a metallic plate, is supported between walls 6 and provides an upper demarcation for the chamber along the bending section. The plate may be received between a pair of flanges extending outwardly of each wall and secured therebetween by welding, mechanical means or any other convenient means.

Plate 9 may be disposed at a distance of about 5 to 20 cm below the bearings 5. Preferably the plate will be about 15 cm from the bearing support for each axle.

Air is heated to a temperature in the range of about 650° C. in chamber 10. The air in the chamber 10 may be at such a pressure that the dynamic pressure under the glass sheet is in the range of about 20 to 300 Pa. An array of perforations 12 in plate 9 provide communication between the chamber 10 and the sheet 1 carried by the conveyor system in the bending section. The perforations may be formed in the plate in a variable density and number and diameters of perforations, as well as at variable locations and/or level of opening. In the form of bending section illustrated in FIG. 1, and in the other Figures as well, the perforations are evenly spaced throughout plate 9 in dispositions wherein the outer perforations are spaced at a distance at least equal to the width of sheet 1 which is conveyed along the bending section.

Without any intent to limit the invention, in a preferred embodiment of the apparatus each perforation may have a diameter of 14 mm, and the perforations may be disposed on 30 mm centers.

A plate 13 is provided for purposes of occluding the perforations either along a central part of the bending section or along lateral parts of the bending section to develop a predetermined dynamic pressure profile across the width of the sheet undergoing bending. In the form of the invention illustrated in FIG. 1, plate 13 is located within a central part of the bending section. The plate may be of a width to occlude the perforations within the central one-third of the array. The plate may be releasably secured on sheet 9 in any position and by any conventional securement means.

In operation of the apparatus of FIG. 1, jets of air are emitted through the several non-occluded perforations providing communication between the chamber and the heating oven to develop a flow of air which reaches the lower side of the sheet between the rollers. The jets of air begin to interfere and mix within the heating oven so that the flow of air which reaches the lower side of the sheet has the desired profile of speed with continuous variation, without peaks of pressure. The dynamic pressure is in the range of about 100 Pa along the lateral edges of the sheet. A slight sinking of the sheet, likely explained by the fact that there is slight vacuum created by a light sucking effect as the gas flows laterally outwardly of the sheet toward the walls 6, is experienced in the central area. This distribution of pressure intervenes in the bending process and strengthens the bending forces in the desired directions. At the same time, the distribution of pressure desirably compensates for the weight of the sheet, not only in the lateral areas but also in its median area since the forces which act to lift the sheet within the region of its outer edges are transmitted, also, to the median area.

The pressure in chamber 10 may be adjusted to develop substantially and dynamic pressure profile under the sheet 1. As discussed the pressure in the chamber such that the dynamic pressure under the glass sheet may be within the range of about 20 to 300 Pa. For example, a pressure of 250 Pa (25 mm water) in the chamber 10 may provide a substantially uniform dynamic pressure of about 100 Pa on the entire surface of the sheet to balance the weight of a sheet having a thickness on the order of about 4 mm. In the described setting, the pressure compensates for about one-half the weight of the sheet to improve substantially the optical quality of the sheet which is bent. If the sheet to be bent is of a thickness less than about 4 mm, the pressure provided to act under the sheet may be reduced. If, on the other hand, the sheet to be bent is of a thickness greater than about 4 mm, the pressure acting under the sheet will be increased.

If the reaction from the rollers is to be reduced within the median area of the sheet, the apparatus within the bending section may take the form illustrated in FIG. 2. By and large, the apparatus illustrated in FIG. 2, except for the conveyor system and the positioning of a plate for occluding a region of perforations within the array, duplicates the apparatus of FIG. 1.

With reference to FIG. 2, each axle of the conveyor system represented as axle 16 is bent in a convex configuration toward the top of the bending section. In this form of apparatus, a pair of plates 18, providing the function of plate 13, are located laterally outwardly of the central part of the bending section to occlude perforations within the outer one-third portions of the array. In this form of the invention, the lateral edges of sheet 17 sink under their own weight, while the dynamic pressure serves to balance the weight of the sheet within the central region.

The plate 9 of the form of apparatus illustrated in FIG. 2 includes an array of perforations having the same setting as the perforations in FIG. 1. The plate, also, is set at a distance of about 15 cm from the location of the sheet in the media area. As indicated, a pair of plates 18 occlude the perforations within the outer one-third of the array to provide a flow of air and a flow pattern from the chamber into the central region of the bending section. The plates 18, as the plate 9, are formed of metal. The plates 18, further, may be releasably secured to plate 9 in the manner of securement of plate 13.

The profile of pressure which is obtained is illustrated in FIG. 2a. Referring to that Figure, it will be noted that there is a slight depression along the edges of sheet 17. The depression, as previously discussed with regard to the profile of pressure in FIG. 1a, likely is created by the flow of gas as the pressure within the central region gradually drops off toward the edges of the sheet to reach a slightly negative value of pressure. A pressure in chamber 10 of about 200 Pa will produce a dynamic pressure in the range of about 100 Pa within the central region of sheet 17.

The bending oven may be divided into several sectors from the upstream to the downstream end. The individual gaseous flows, also, may be separately adjusted within each sector. Thus, in the direction of movement of the sheet, if it is considered necessary, it will be possible to adjust the speed of flow of the gas and to provide for different gaseous flow patterns, for example, the patterns of FIGS. 1a and 2a, within the sectors to provide optimum results in the bending of a sheet.

An additional modification of the bending section is illustrated in FIG. 3. In this modification, a pair of nozzles 21 are located in a position within the bending section, above the sheet, for directing a flow of gas toward the lateral edges of the sheet. A conduit 20 connects each nozzle to the chamber 10. The bending section of FIG. 3 is of the type illustrated in FIG. 2 to include rollers of the conveyor system which are concave toward the top of the bending section, so that the auxiliary flow of gas directed from the top toward the sheet acts along the lateral edges of the sheet thus assisting and accelerating the bending process. Conduits 20 extend through the walls 6 and provide an isolated path of flow of the auxiliary gas. The nozzles 21 each include a perforated plate to direct auxiliary gaseous flow toward the sheet 17 in a pattern substantially like the pattern of the gaseous flow which flows through the perforations 12. The conduits may be suitably sealed at the points of passage through the walls to prevent undue heat transfer from the chamber and the heating oven to the ambient environment.

As generally illustrated in FIG. 3, air may be received into chamber 10 from a distributor 26. As illustrated in FIG. 4, distributor 26 may be located in a closed circuit including a hood 23 in communication with the heating section and a conduit 24 providing a recirculating flow path for the gaseous flow. A blower 25 will maintain the recirculating flow and the gas may be reheated to a temperature within the range of about 650° C. in a reheating chamber 27. The form of bending section of FIG. 4 otherwise duplicates the form of bending section illustrated in FIG. 2.

We claim:

1. A method for the transportation of a glass mass disposed in substantially horizontal plane on a conveyor system along a path in a heating oven of a bending station to improve the bending of said glass mass, said method comprising providing a driving rotational input to a plurality of rollers of said conveyor system along said path, said rollers of said conveyor system comprising a family of rollers each formed to one of a concave or convex configuration along their length across said heating oven and of an outline substantially complementary to the configuration to which the glass mass is to be bent, and substantially simultaneously impinging a gaseous flow throughout the width of the lower surface of said glass mass, said gaseous flow impinging on said lower surface at a flow speed and pressure which varies continuously over said width to balance a part of the weight of said glass mass and support predetermined areas of said glass mass across said width with different values of dynamic pressure whereupon areas of said glass mass contact said rollers over a period of contact longer than the period of contact of other areas across said width which are permitted to move toward said rollers under forces of gravity.

2. The method of claim 1 comprising heating said glass mass along said path, and heating said gas to provide a gaseous flow at high temperature.

3. The method of claim 1 wherein the output of average emission of said gaseous flow per unit of said lower surface varies across said width so that the pressure exerted on said glass mass varies continuously.

4. The method of claim 3 including adjusting said gaseous flow so that said gaseous flow moves more directly toward a selected area across said width.

5. The method of claim 4 wherein said adjustment of said gaseous flow creates a spread of dynamic pressure across said width between 20 and 300 Pa.

6. The method of claim 1, further adjusting the pressure exerted by said gaseous flow to a value at the lowest region of said rollers which is lower than the value of pressure exerted by said gaseous flow at other regions.

7. The method of claim 6 including substantially simultaneously impinging an auxiliary gaseous flow on the upper surface of said glass mass opposite to said lowest region.

8. The method of claim 1 wherein said gaseous flow which impinges throughout said lower surface of said glass mass varies in the direction along said path.

9. Apparatus for transporting a glass mass through a heating oven along a path from an upstream to a downstream location of a bending station while said glass mass is permitted to bend in a direction transverse to said direction of movement along said path, comprising a conveyor system formed by a plurality of rollers extending across said path for supporting said glass mass in transit, said rollers of said conveyor system comprising a family of rollers each formed to one of a concave or convex configuration along their length across said heating oven and of an outline substantially complementary to the configuration to which the glass mass is allowed to bend, a chamber below said path adapted for connection in a recirculating flow system for a gas under pressure, and means between said chamber and conveyor system for adjusting a pressurized gaseous flow along specific areas in a spread of dynamic pressure to balance a part of the weight of said glass mass and support predetermined areas of said glass mass across its width with different values of dynamic pressure whereupon areas of said glass mass contact said rollers over a period of contact longer than the period of contact of other areas across said width which are permitted to move in bending movement toward said rollers under forces of gravity.

10. The apparatus of claim 9 wherein said adjusting means comprises a plate including an array of perforations, each perforation serving as a source of said gaseous flow under pressure.

11. The apparatus of claim 10 wherein said perforations are located in a uniform pattern, and wherein said plate is spaced at a distance of from 5 to 20 cm from said conveyor system.

12. The apparatus of claim 10 including means for occluding a portion of said perforations whereby said gaseous flow speed and pressure varies continuously across the width of said glass mass.

13. The apparatus of claim 10 including an auxiliary path for flow of gas under pressure, said auxiliary path comprised of a conduit connected at one end to said chamber and at the other end in said path above said conveyor system, and a nozzle at said other end for directing said gaseous flow on the surface of said glass mass opposite the primary flow.

14. The apparatus of claim 13 wherein said auxiliary flow path is comprised of a pair of conduits for directing said gaseous flow on the surface of said glass mass opposite the primary flow and along the lateral edge of said surface.

* * * * *